United States Patent
Bauldree et al.

(10) Patent No.: US 9,928,702 B2
(45) Date of Patent: Mar. 27, 2018

(54) FIRST RESPONSE LOCATOR SYSTEM

(71) Applicants: Kenneth Bauldree, Doylestown, PA (US); Angela Glynn, Ft. Meyers, FL (US)

(72) Inventors: Kenneth Bauldree, Doylestown, PA (US); Angela Glynn, Ft. Meyers, FL (US)

(73) Assignee: First Response Locator Systems of America, LLC, Macon, GA (US)

( * ) Notice: Subject to any disclaimer, the term of this patent is extended or adjusted under 35 U.S.C. 154(b) by 0 days.

(21) Appl. No.: 15/584,781

(22) Filed: May 2, 2017

(65) Prior Publication Data

US 2018/0047261 A1 Feb. 15, 2018

Related U.S. Application Data

(63) Continuation-in-part of application No. 15/235,493, filed on Aug. 12, 2016.

(51) Int. Cl.
| | | |
|---|---|---|
| *G08B 7/06* | (2006.01) | |
| *G01S 19/48* | (2010.01) | |
| *G08B 21/02* | (2006.01) | |
| *G08B 5/36* | (2006.01) | |
| *G01S 19/17* | (2010.01) | |
| *G01S 5/00* | (2006.01) | |

(52) U.S. Cl.
CPC ............ *G08B 7/064* (2013.01); *G01S 5/0009* (2013.01); *G01S 19/17* (2013.01); *G01S 19/48* (2013.01); *G08B 5/36* (2013.01); *G08B 21/02* (2013.01)

(58) Field of Classification Search
CPC ... G06F 3/04842; G08B 26/003; G08B 7/064; G08B 5/36; G08B 21/02; G08B 21/0438; G01S 5/0009; G01S 19/17; G01S 19/48; H04W 4/22; H04W 4/025
USPC ........................................ 340/8.1; 455/404.2
See application file for complete search history.

(56) References Cited

U.S. PATENT DOCUMENTS

| | | | |
|---|---|---|---|
| 7,068,760 B2* | 6/2006 | Binning | H04M 11/04 379/45 |
| 9,349,262 B2* | 5/2016 | Henrie | G08B 5/38 |
| 9,619,125 B2* | 4/2017 | Ruszala | G06F 3/04842 |
| 2005/0134455 A1* | 6/2005 | Binning | G08B 7/064 340/539.18 |
| 2005/0143048 A1* | 6/2005 | Binning | H04L 12/66 455/404.2 |
| 2016/0063824 A1* | 3/2016 | Fiore | G08B 5/38 340/691.8 |
| 2016/0284170 A1* | 9/2016 | Kasmir | H04L 12/2818 |
| 2017/0046926 A1* | 2/2017 | Bauldree | G08B 7/064 |

* cited by examiner

*Primary Examiner* — Ali Neyzari
(74) *Attorney, Agent, or Firm* — Jason T. Daniel, Esq.; Daniel Law Offices, P.A.

(57) ABSTRACT

A first response locator system includes at least one emergency locator unit having a main body and a lighting unit for generating light in a plurality of different colors. Indicia is disposed along the main body, and a speaker for generating an audible sound is positioned along the main body. An internal controller controls the operation of the speaker and the lighting unit. A remote operation device communicates with the internal controller and includes a plurality of buttons for selectively activating one or both of the lighting unit and the speaker.

20 Claims, 8 Drawing Sheets

FIRST RESPONSE LOCATOR SYSTEM

CROSS-REFERENCE TO RELATED APPLICATIONS

This application claims the benefit of U.S. application Ser. No. 62/205,477 filed on Aug. 14, 2015, and U.S. application Ser. No. 15/235,493 filed on Aug. 12, 2016, the contents of each of which are incorporated herein by reference.

TECHNICAL FIELD

The present invention relates generally to life safety devices, and more particularly to a first response locator system that can be selectively activated in an emergency situation.

BACKGROUND

The statements in this section merely provide background information related to the present disclosure and may not constitute prior art.

When emergencies occur within a structure such as a home, apartment, or office building, for example, it is important that a first responder be able to quickly find the individual in distress. Whether the emergency requires the assistance of the police, paramedic/EMS, or the fire department, a few seconds can sometimes mean the difference between life and death.

In recent years, the implementation of GPS navigation systems within first responder vehicles has drastically shortened response times. Although these systems are extremely useful for finding the street or high-rise structure on which the emergency is located, first responders often spend several minutes attempting to locate the correct home or apartment unit. This is especially true at night, where individual house and/or unit numbers may not be sufficiently illuminated.

Within the United States, virtually every home, apartment, condo, and/or business location has a mailbox that is used for sending and receiving mail through the U.S. Postal Service. For detached homes, the mailbox typically includes a freestanding pedestal unit that is located adjacent to the street. Conversely, multi-dwelling units often utilize wall mounted units that are secured to an exterior wall of the building at a location adjacent to the apartment door. In either instance, such mailboxes often display the home or unit number to which it belongs, and it is this address which first responders look for in identifying they have arrived at the correct location.

Accordingly, it would be beneficial to provide a first response locator system that can function alone or in conjunction with a mailbox to provide a conspicuous visual indication of the location of an emergency to first responders. Additionally, it would be beneficial to provide first responders with the exact location of the person requesting assistance upon arrival at the building or residence to which an emergency locator unit is located.

SUMMARY OF THE INVENTION

The present invention is directed to a first response locator system. One embodiment of the present invention can include at least one emergency locator unit which can be positioned at a conspicuous outdoor location such as at a mailbox or a building wall. Each of the locator units can include a lighting unit having at least one lighting element which can generate light in a plurality of different colors such as red, blue, and green, for example. Each of the locator units can also include a speaker for generating an audible sound. The lighting unit and speaker can be controlled by an internal controller having a communication unit that is capable of receiving operating instructions from an external device.

Another embodiment of the present invention can include one or more remote operation devices that can communicate with the internal controller to selectively activate one or both of the lighting unit and the speaker. The remote operation devices can be constructed as a portable unit that is small enough to fit in the pocket of clothing, or can be permanently affixed within a structure. The remote operation device can include a plurality of buttons which can be selectively activated to correspond to a fire, medical or police emergency.

In yet another embodiment one or both of the emergency locator unit and the remote operation devices can include a locator module. The location information captured by the locator module can be transmitted to a call center for aiding first responders in locating both the emergency locator unit, and the remote operation device.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
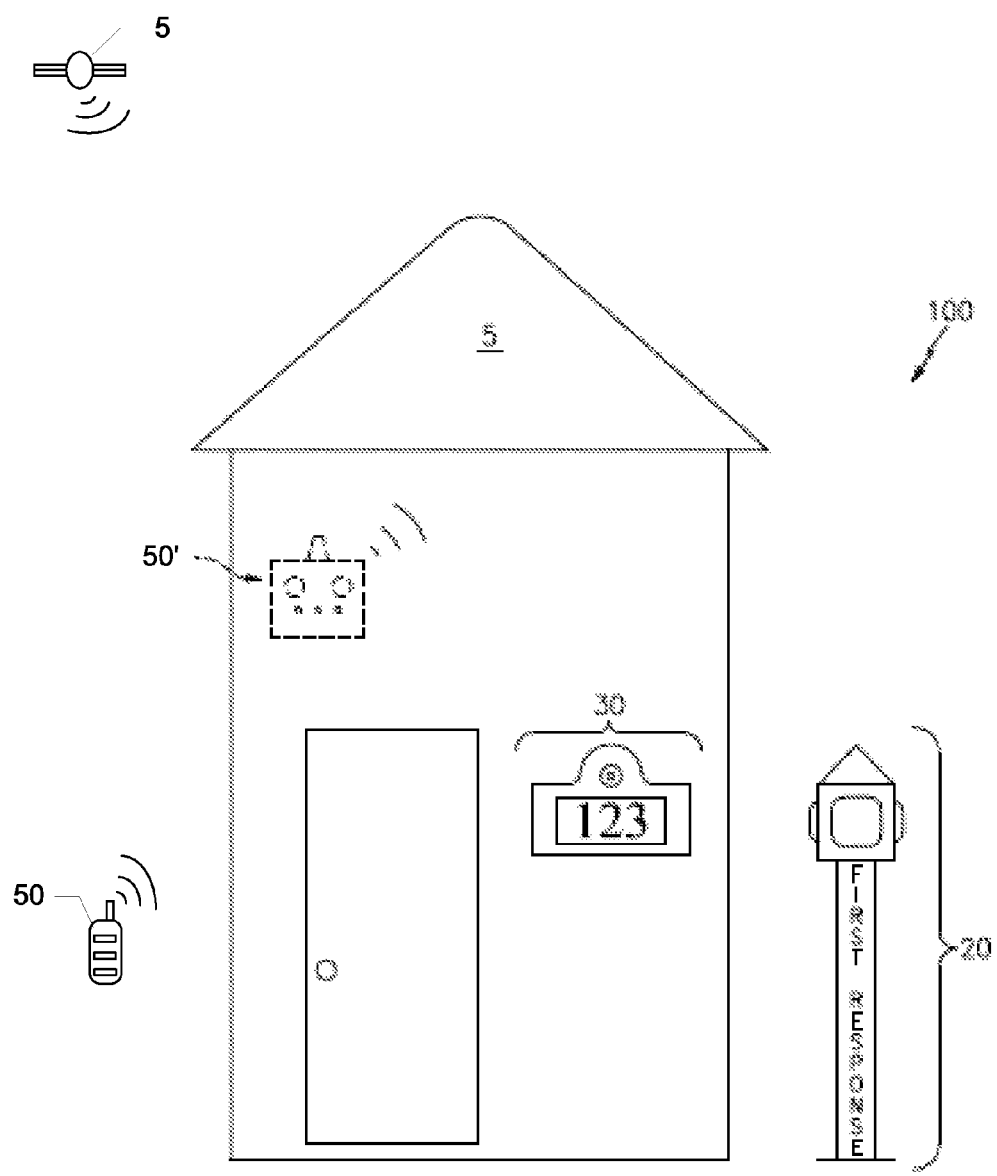
FIG. 1 is an exemplary operating environment of a first response locator system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, a "call center" can include one or more offsite locations that are equipped to communicate with each of the below described first response locator systems. In this regard, the call center(s) can act as a function of the First Response Locator System umbrella, and/or can include any number of third party companies who provide alarm monitoring, for example. In either instance, the call center(s) can function to monitor the first response systems and take appropriate action when necessary, including dispatching police and fire as well as private emergency response services, when a system is activated by a user.

In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 illustrates one embodiment of the first response locator system 100 for assisting first responders to locate a particular building or residence 5. As shown, the system can include a one or both of a freestanding emergency locator unit 20, and a compact emergency locator unit 30, that are in communication with one or more remote operation devices 50 and 50'.

Figure 2A:
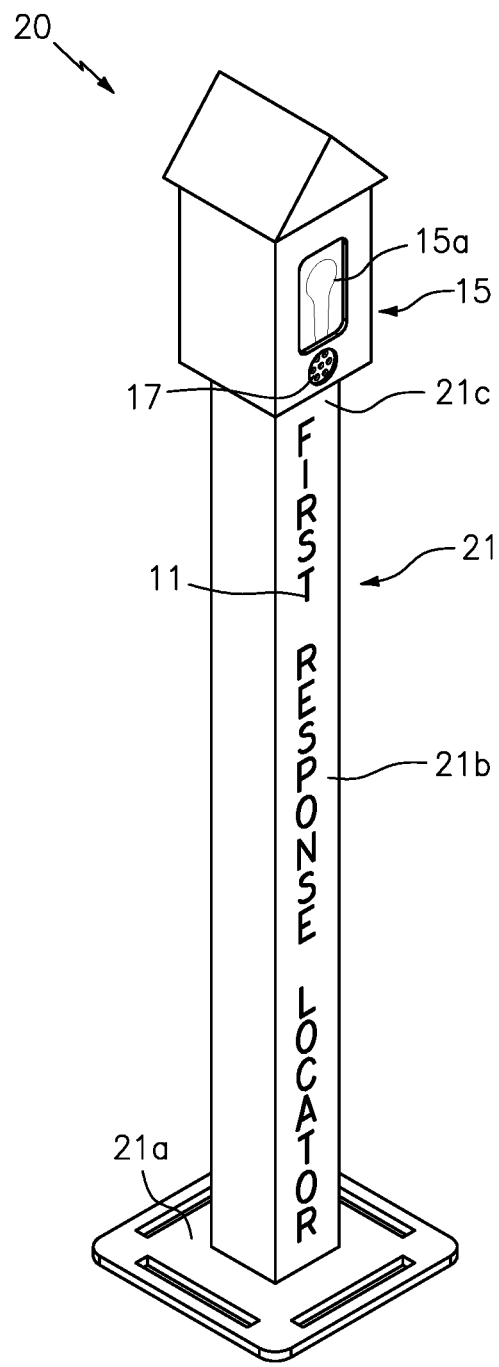
FIG. 2A is a front side view of a freestanding emergency locator unit of the system, in accordance with one embodiment of the invention.

FIG. 2A, illustrates one embodiment of a freestanding emergency locator unit 20 that includes an elongated main body 21 having a bottom end 21a for engaging the ground, a middle section 21b and a top end 21c. The main body can include any number of different shapes and sizes, and can function to house the below described internal controller 40. As such, the main body can be constructed from any number of different materials that are suitable for prolonged use in an outdoor environment (i.e., weather resistant), such as various metals, plastics and/or composites, for example.

Figure 2B:
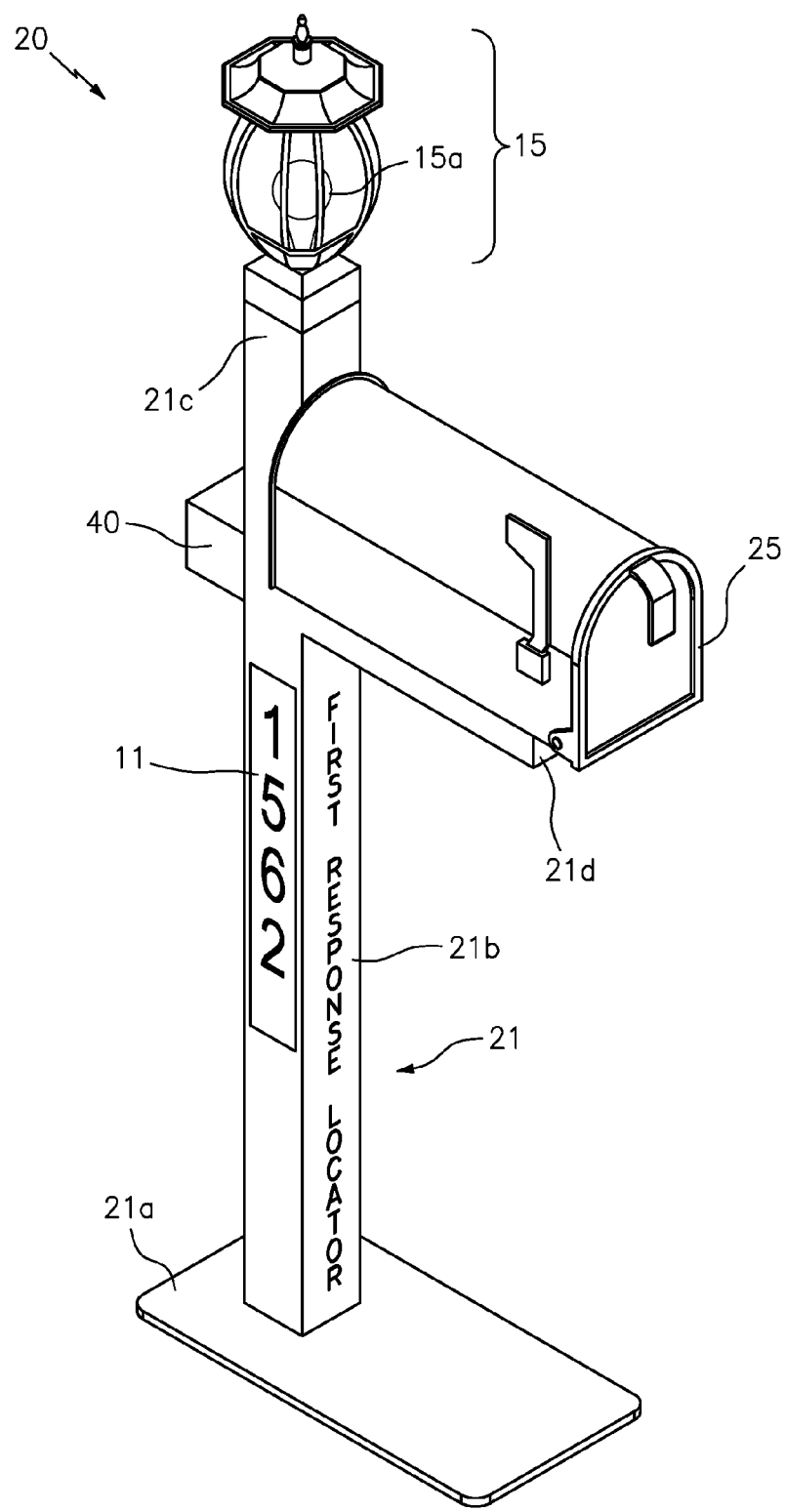
FIG. 2B is a perspective view of another freestanding emergency locator unit of the system, in accordance with one embodiment of the invention.

As shown in FIG. 2B, the freestanding main body 21 can also include a generally horizontal arm 21d onto which a mailbox 25 can be secured. In various embodiments, the horizontal arm can be positioned so as to ensure the height of the mailbox 25 from the ground is in compliance with any applicable laws and/or ordinances. Such a feature is particularly advantageous for new construction projects wherein the lifesaving benefits of the first response locator system can be seamlessly incorporated into the design of a new mailbox and can be deployed uniformly across an entire subdivision.

In either instance, the locator unit 20 can also include any type of indicia 11, such as the building address, and/or emergency identification information, which clearly describe the purpose for the device to which the indicia is attached. Of course, the term "indicia" can also include any type of decorative and/or functional elements such as various colors, markings, words, shapes, symbols, logos, designs, lights, types of materials, texturing of materials, patterns, images, lithographs, and/or photographs, for example. The indicia can be secured onto and/or into the main body in accordance with known techniques so as to be flush with the surface of the main body or can be raised/protruding outward from the main body so as to give a three dimensional effect.

A lighting unit 15 can be provided along the main body in order to provide a clear visual indication of the location of an emergency. As shown, the lighting unit of the freestanding locator unit 20 can preferably include a decorative shape that can be positioned at the top end of the main body 21c, so as disburse a bright beam of light in a 360 degree field of view. Of course, the lighting unit 15 is not to be construed as limited to the illustrated shape or location along the associated main body, as the lighting unit can include any shape, any size and can be secured along any location of the main body (See FIGS. 3A and 3B).

In either instance, the lighting unit 15 can function to house any number of different lighting elements 15a, such as one or more light emitting diodes (LED), for example. Of course the lighting unit is not limited to the use of LED's, as any type and number of light producing element(s) can be utilized herein. Several nonlimiting examples include compact fluorescent, incandescent, and/or halogen, for example.

As will be described below, the lighting unit 15 can be controlled by the internal controller 40 and can be selectively activated via the remote operation device 50. In the preferred embodiment, the lighting elements 15a will be configured to generate red, green and blue light. Of course, the lighting unit can function to generate continuous and/or bursts of light in any number of different colors, intensities and/or durations.

In various embodiments, one or more speakers 17 can also be provided along the main body and/or the lighting unit 15. Each of the speakers can function to play an audible sound such as an alarm tone and/or a pre-recorded message, for example, based on an instruction from the internal controller 40 and the remote operation device 50.

Figure 3A:
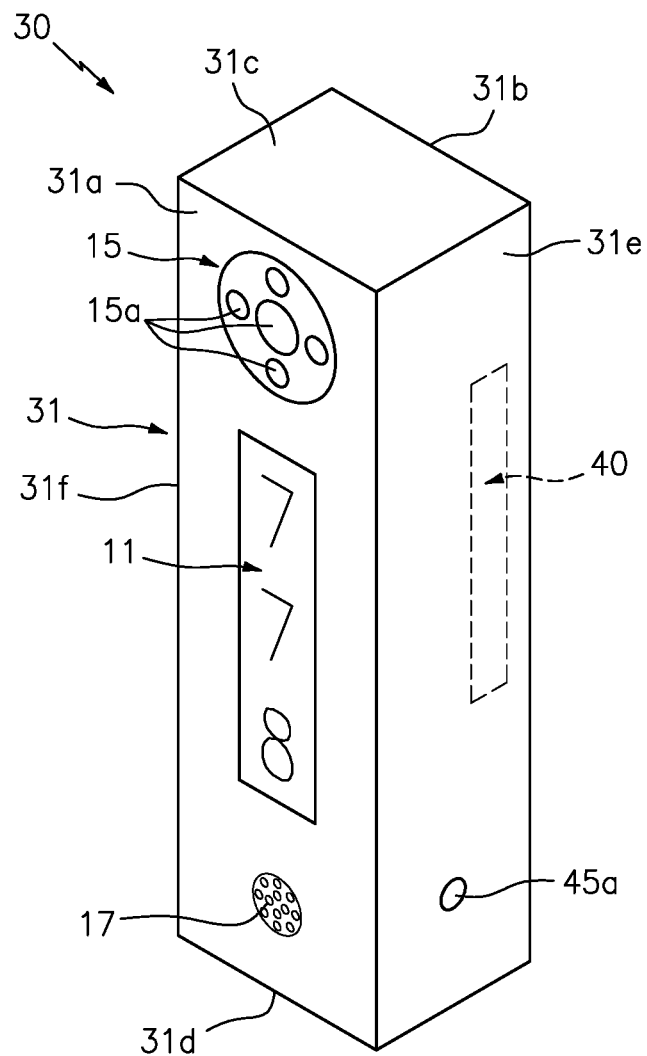
FIG. 3A is a perspective view of a compact emergency locator unit of the system, in accordance with one embodiment of the invention.
Figure 3B:
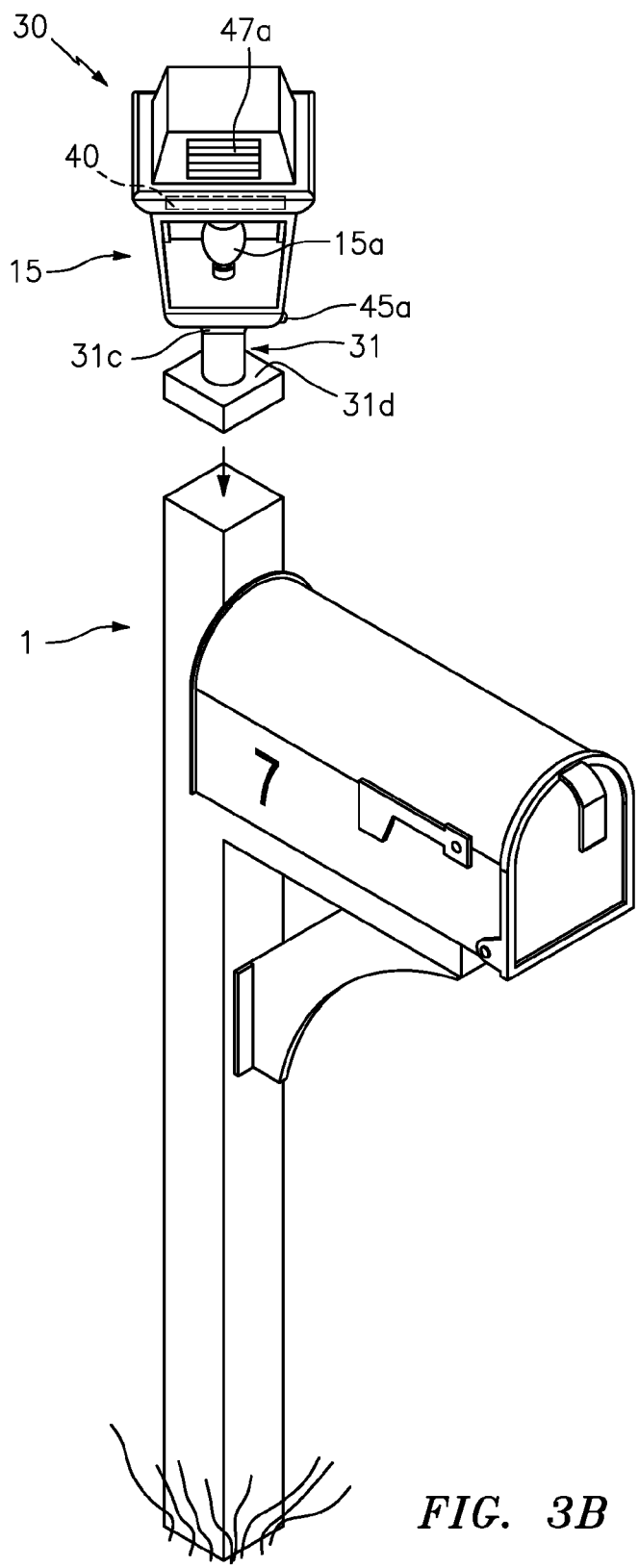
FIG. 3B is a perspective view of another compact emergency locator unit of the system, in accordance with one embodiment of the invention.

FIGS. 3A and 3B illustrate various embodiments of a compact emergency locator unit 30, which can be used at locations such as apartment buildings, for example, where it is not possible to utilize a freestanding unit 20. The compact locator unit 30 can also be secured onto other structures such as an existing mailbox, for example, so as to allow the same to be retrofitted with the lifesaving features provided by the first response locator system.

As shown, the compact emergency locator unit 30 can include a main body 31 having a front surface 31a, a back surface 31b a top surface 31c, a bottom surface 31d and a pair of opposing side surfaces 31e and 31f that define a generally hollow interior space for housing the below described internal controller 40.

The main body 31 can include an unlimited number of different and/or decorative shapes and sizes such as square, oval, or rectangular, for example, and can also be constructed from any number of different materials that are suitable for prolonged use in an outdoor environment, such as various metals, plastics and/or composites, for example.

As shown in FIG. 3A, one embodiment of the compact locator unit 30 can include a generally flat back surface 31b so as to allow the unit to include or be fitted with any type of mounting hardware and/or brackets (not illustrated). Such a feature allows the device 30 to be secured onto a secondary object such as an office/apartment building wall, for example.

In the present embodiment, the lighting unit 15 can include a non-decorative shape having a generally flat front surface that is positioned along the main body 31 so as to allow the lighting elements 15a to disburse the generated light outward from the front surface thereof. Likewise, the speaker 17 and indicia 11 can be provided along the front surface of the main body. Of course, the unit 30 is not limited to the illustrated shape or arrangement of components, as many different modifications to the same are also contemplated.

For example, FIG. 3B illustrates one embodiment of a compact emergency locator unit 30 that includes a decorative lighting unit 15 that extends upward from the top surface 31c of the main body. In the present example, the bottom surface 31d can be generally flat, so as to allow the unit to include or be fitted with a post bracket 35, or other such mounting hardware. Such a feature allows the device 30 to be secured onto the top of an existing mailbox 1 or other such structure, for example.

Figure 4:
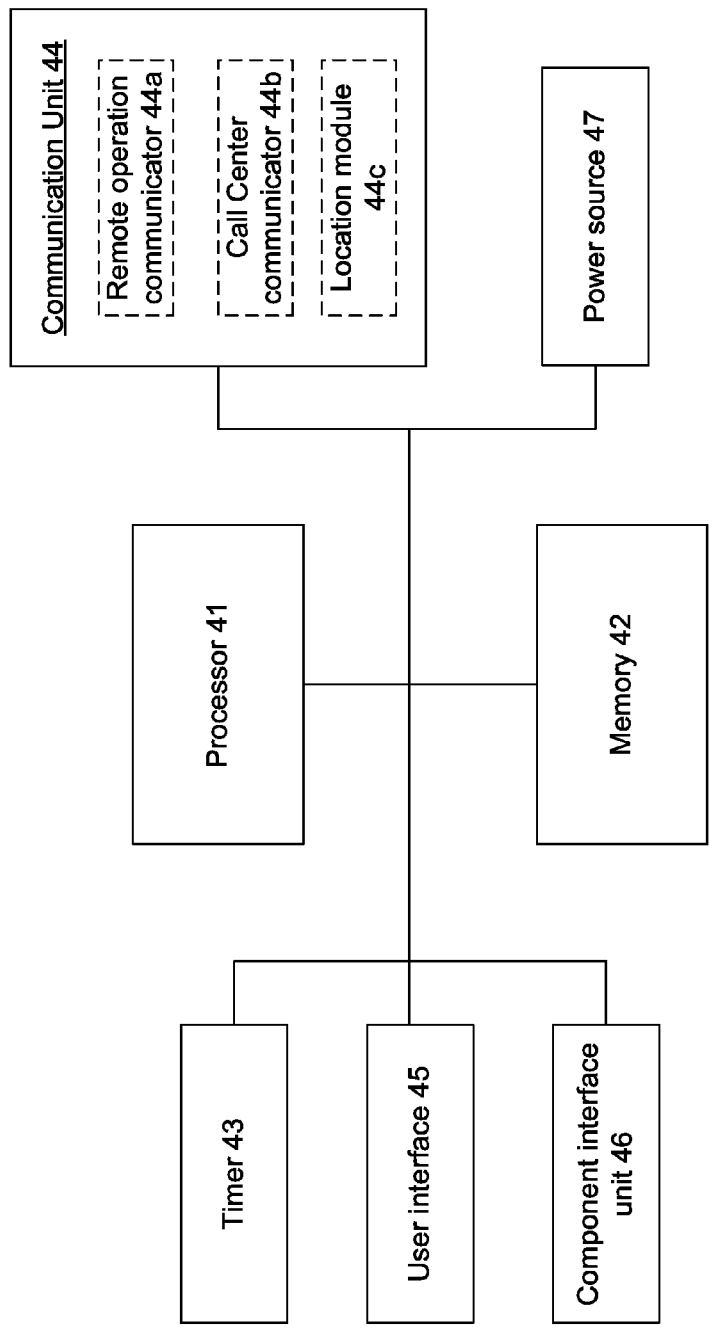
FIG. 4 is a simplified block diagram of the internal controller of the emergency locator unit, in accordance with one embodiment of the invention.

FIG. 4 is an exemplary block diagram of an internal controller 40 which can be provided within the main body and/or lighting unit of the locator units 20 and 30. As shown, the internal controller 40 can include any number of components such as a processor 41 that is conventionally connected to an internal memory 42, a timer module 43, a communication unit 44, a user interface 45, a component interface unit 46, and/or a power source 47.

The processor/CPU 41 can act to execute program code stored in the memory 42 in order to allow the device to perform the functionality described herein. Likewise, a timer module 43 can be provided, and can function to accurately measure the passage of time. As described herein, the timer module can be provided as a function of the processor or can include a separate physical circuit. In either instance, processors and timers are extremely well known in the art, therefore no further description will be provided.

Memory 42 can act to store operating instructions in the form of program code for the processor 41 to execute. Although illustrated in FIG. 4 as a single component, memory 42 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example. Additionally, memory 42 can also include one or more cache memories that provide temporary storage of at least some program code in order to reduce the number of times program code must be retrieved from the bulk storage device during execution. Each of these devices are well known in the art.

The communication unit 44 can function to provide wired or wireless communication between the internal controller 40 and external devices. For example, the communication unit 44 can include a remote operation communicator 44a in the form of a variable radio wave transceiver 44a which can send and/or receive information wirelessly with the below described remote operation device(s) 50 and 50'. Alternatively, or in addition thereto, the remote operation communicator 44a can include a Bluetooth transceiver for communicating wirelessly with a portable user device such as the device 50' and/or a smartphone that is running a First Response Locator App, for example. Of course, any number of other known transmission and reception mechanisms and protocols can also be utilized herein.

In another embodiment, the communication unit 44 can also include a call center communicator 44b in the form of a cellular telephone, hard wired telephone and/or network adapter functioning to communicate over a WAN, LAN or the internet via an internet service provider, for example.

The call center communicator can function to allow the device to send alarm, emergency and/or location information to a call center who can utilize the information to guide pertinent emergency services to the location of the emergency.

In another embodiment, the communication unit 44 can also include a location module 44c in the form of a cellular telephone location system and/or a satellite-based location tracking unit for communicating with a satellite. In this regard, the module can include a GPS signal antenna, for example, which can work with the processor and memory to receive and store the location coordinates of the locator unit (e.g., location information), which can be transmitted to the above noted call center.

The user interface 45 can function to accept user inputs for instructing device operation. As such, the user interface can include or control one or more buttons/switches 45a that are connected to the processor 41 so as to activate various programmatic functions, such as pairing the unit with an external device and/or transitioning the device between an ON and OFF operating state, for example.

The component interface unit 46 can function to provide a communicative link between the processor 41 and various other device components such as the above described lighting unit 15 and/or speaker 17, for example. In this regard, the component interface unit can include any number of different components such as one or more PIC microcontrollers, internal bus, USB connections and other such hardware capable of providing a direct link between the various components. Of course any other means for providing the two way communication between the identified components can also be utilized herein.

The power source 47 can include any number of different components capable of providing the necessary power requirements to each element of the locator unit. To this end, the power source can include or comprise any number of different batteries and/or can include a common A/C electrical power transformer and cord capable of allowing the locator unit to be powered from an electrical outlet. In various embodiments, the power source can also include one or more solar panels 47a which can use the sun to power the device.

The system 100 can include any number of remote operation devices which can function to selectively activate one or more of the above described emergency locator units.

Figure 5A:
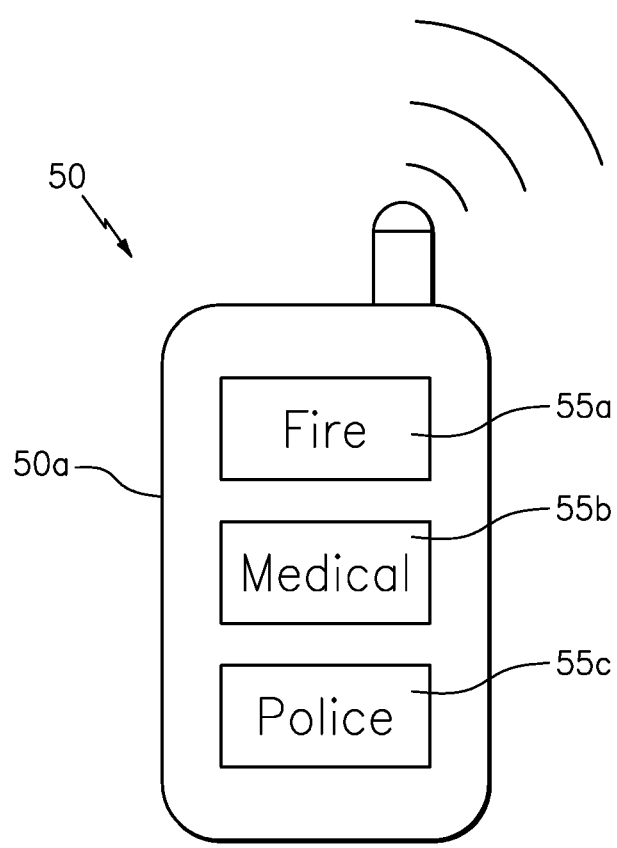
FIG. 5A is a perspective view of the remote operation device of the system, in accordance with one embodiment of the invention.
Figure 5B:
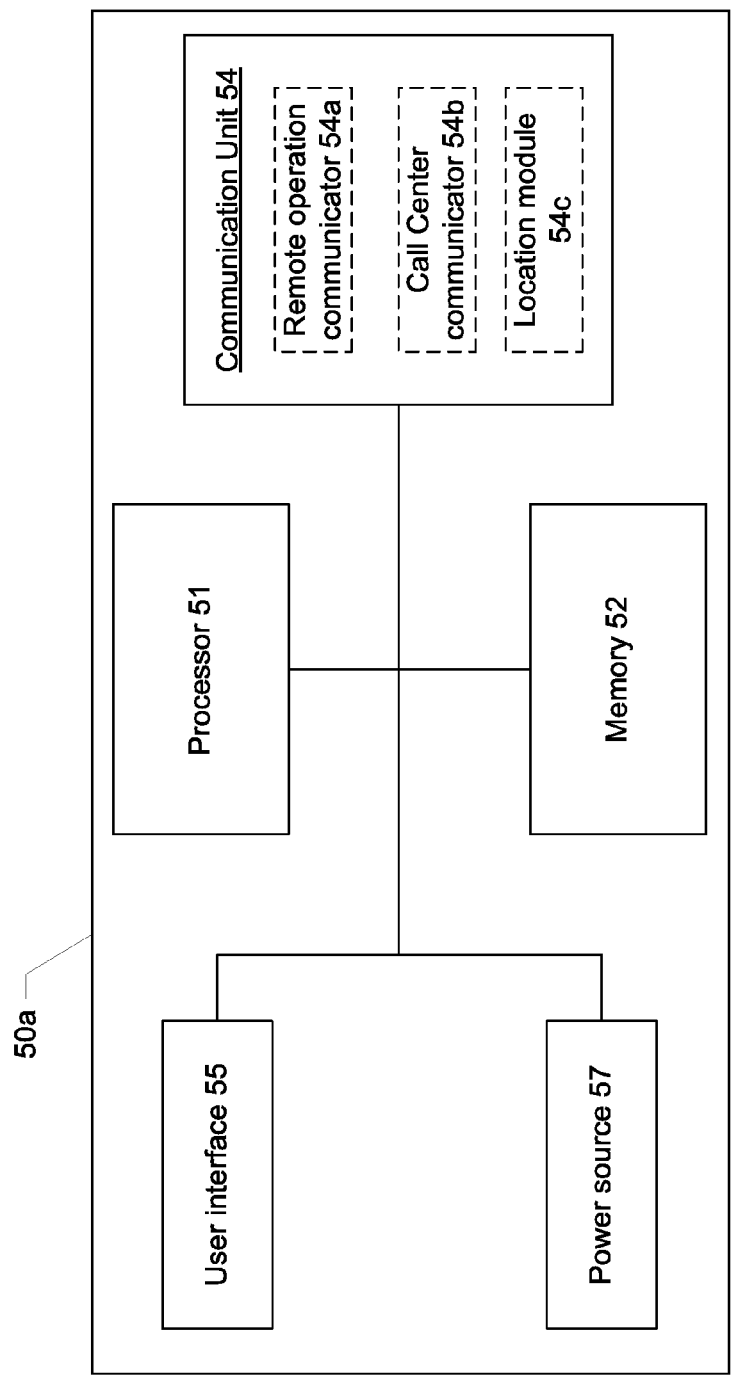
FIG. 5B is a simplified block diagram of the internal components of the remote operation device of the system, in accordance with one embodiment of the invention.

To this end, FIGS. 5A and 5B illustrate one nonlimiting embodiment of a remote operation device 50. As shown, the device can include a main body 50a which houses an internal processor 51, memory 52, communication unit 54, user interface 55 and power source 57. Each of the components 51, 52, 54, 55 and 57 being identical in form and function to those described above with respect to components 41, 42, 44, 45 and 47, respectively, therefore a duplicate description is not provided.

The main body 50a can include any number of different shapes and sizes, and can be constructed from any number of different materials such as plastic, for example. In the preferred embodiment, the main body can be constructed so as to be portable in nature (e.g., pendant or keychain), so as to be carried by a user; however other embodiments are also contemplated (see 50' below).

In either instance, the device 50 can include a plurality of user interface components, such as the illustrated buttons, for example, that can be provided at any location along the main body 50a. Each of the buttons can function to selectively activate the lighting unit 15 and/or speaker 17 of an emergency locator unit to which the remote operation device is programed to communicate with.

In one nonlimiting example, the remote operation device 50 can include a first button 55a which can be selectively engaged by a user to transmit a first signal to the internal controller 40 of an emergency locator unit 20 and/or 30. Upon receiving the first signal, the lighting unit 15 can immediately begin to flash red light, so as to assist firefighters in locating the building or residence at which a fire is occurring. Simultaneously to this action, the location of the remote operation device 50 itself can be captured by the location information module 54c, and can be transmitted to a remote call center via one or both of the call center communicators 54b or 44b. Such a feature can act to assist firefighters upon arrival in locating the individual holding the remote operation unit, so as to ensure they are no longer within the building.

In another nonlimiting example, the remote operation device 50 can include a second button 55b which can be selectively engaged by a user to transmit a second signal to the internal controller 40 of a particular location unit 20 and/or 30. In the present example, receipt of this second signal can cause the lighting unit 15 to flash blue light, so as to assist EMS responders in locating the building or residence at which a medical emergency is occurring. Simultaneously to this action, the location of the remote operation device 50 itself can be captured by the location information module 54c, and can be transmitted to a remote call center via one or both of the call center communicators 54b or 44b. Such a feature can act to assist EMS upon arrival in locating the individual having the medical emergency. Such a feature is particularly advantageous, as such a situation may occur at a swimming pool or other location not within the building itself.

In yet another nonlimiting example, the remote operation device 50 can include a third button 55c which can be selectively engaged by a user to transmit a third signal to the internal controller 40 of a particular location unit 20 and/or 30. In the present example, receipt of this third signal can cause the speaker 17 to produce an alarm, and can cause the lighting unit 15 to flash red and blue light, so as to assist police in locating the building or residence at which help is needed. Simultaneously to this action, the location of the remote operation device 50 itself can be captured by the location information module 54c, and can be transmitted to a remote call center via one or both of the call center communicators 54b or 44b. Such a feature can act to assist police upon arrival in locating the individual in distress. Such a feature is particularly advantageous, as such a situation may occur at a location adjacent to the building itself.

The lighting unit and/or speakers in the above described examples can be programmed to operate only for a predetermined period of time, such as 30 minutes, for example, utilizing the internal timer, or can continue to operate until the respective button has been pressed again, thereby deactivating the operation of the locator unit.

In this regard, upon the occurrence of an emergency situation, the system 100 provides a means for allowing first responders to quickly identify the address/physical location of the emergency while driving thereto, via the locator unit(s) 20 and/or 30. Moreover, upon arrival, the system can provide the first responders with the exact location of the individual in distress, based on the location of the remote operation unit 50. This can be accomplished by verbal relay of the location by the call center staff to the first responder over the telephone, for example, or via electronic patch wherein the coordinates are sent directly to a portable electronic device carried by the first responder.

Finally, by providing a call center communicator within both the locator unit 44b, and the remote operation unit 54b, the system 100 has a built in redundant mechanism for ensuring the call center is notified of the emergency and can take action to notify first responders.

Although described above with regard to particular examples, the inventive concepts are not so limiting. As such, those of skill in the art will recognize that any number of different programmatic instructions can be sent and received between the respective devices in order to utilize the functionality of the individual location units. For example, the system can further include functionality for automatically activating the lighting unit between dusk and dawn, when no emergency is occurring. When so activated, the light will preferably include a soft white hew which can illuminate the device and deter criminal activity nearby.

Finally, although described above with regard to a portable unit, other embodiments are also contemplated. For example, the system 100 can also include a fixed-location remote operation unit 50' (See FIG. 1), having a shape and design that is suitable for being fixedly and/or permanently mounted to a wall or other suitable location within a building. As described herein, the unit 50' can include the same components as the above described portable unit 50, therefore a duplicate description is not provided. Such a feature is beneficial in the event the user loses the portable unit and needs assistance.

Accordingly, the above described first response locator system can function to provide an immediate visual indication of the location of an emergency, which can be viewed from great distances by a first responder.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A first response locator system, said system comprising:
   an emergency locator unit that includes
      a main body having a first shape,
      a lighting unit that is connected to the main body,
      at least one lighting element that is positioned within the lighting unit, and
      an internal controller that is in communication with the lighting unit, said internal controller including a locator module for independently receiving and storing a location of the emergency locator unit to which the internal controller is installed;
   a remote operation device that includes
      one or more user input members that correspond to a request for assistance, and
      a communication unit that is configured to transmit a signal to the internal controller to selectively activate the lighting unit when the one or more user input members is engaged; and
   a call center communicator that is configured to transmit the corresponding request for assistance, and the location of the emergency locator unit to a call center,
   wherein the call center communicator is located within one of the emergency locator unit and the remote operation device.

2. The system of claim 1, further comprising:
   a speaker that is disposed along at least one of the main body and the lighting unit, said speaker being in communication with the internal controller and being selectively activated by the remote operation device.

3. The system of claim 1, wherein the at least one lighting element includes one or more light emitting diodes that are configured to generate light at a plurality of different colors.

4. The system of claim 1, wherein the at least one lighting element includes a plurality of light emitting diodes that are each configured to simultaneously generate light at a plurality of different colors.

5. The system of claim 1, wherein the remote operation device includes a portable main body, and
   a remote location module that independently receives and stores a location of the remote operation device.

6. The system of claim 1, wherein the one or more user input members includes a button that corresponds to a request for firefighter assistance, and
   the communication unit is configured to instruct the lighting unit to produce red light for a predetermined period of time.

7. The system of claim 1, wherein the one or more user input members includes a button that corresponds to a request for medical assistance, and
   the communication unit is configured to instruct the lighting unit to produce blue light for a predetermined period of time.

8. The system of claim 1, wherein the one or more user input members includes a button that corresponds to a request for police assistance, and
   the communication unit is configured to instruct the lighting unit to produce alternating beams of blue light and red light for a predetermined period of time.

9. The system of claim 1, wherein the first shape of the main body comprises:
   an elongated freestanding unit having a top end, a bottom end, and a middle section, and said lighting unit includes a decorative shape that is disposed along the top end of the main body.

10. The system of claim 9, further comprising:
    an arm that extends outward from the main body at a generally perpendicular angle; and
    a mailbox that is disposed along the arm.

11. The system of claim 1, wherein the first shape of the main body comprises:
    a compact decorative shape having a front surface, and a generally flat back surface that is configured to receive a wall mounting bracket.

12. The system of claim 11, wherein the lighting unit includes a non-decorative shape having a generally flat front surface that is positioned along the front surface of the main body.

13. The system of claim 12, further comprising:
    indicia that is secured along the main body, said indicia including at least one of an address information and an emergency information.

14. The system of claim 1, wherein the main body comprises:
    a compact decorative shape having a top surface, and a generally flat bottom surface; and
    a post bracket that is removably secured along the bottom surface.

15. The system of claim 14, wherein the lighting unit includes a decorative shape that is positioned along the top surface of the main body.

16. The system of claim 15, further comprising:
    at least one solar panel that is disposed along the lighting unit.

17. The system of claim 5, wherein the locator module and the remote location module each comprise, at least one of a cellular telephone location system and a satellite-based location tracking system.

18. The system of claim 5, wherein the call center communicator is configured to transmit both the location of the emergency locator unit, and the location of the remote operation device to the call center.

19. The system of claim 5, further comprising:
    a second call center communicator that is positioned within the remote operation device.

20. The system of claim 19, wherein the call center communicator is positioned within the emergency locator unit, and
    both the call center communicator and the second call center communicator are configured to independently transmit the corresponding request for assistance, and the location of at least one of the emergency locator unit and the remote operation device to the call center.

* * * * *